(12) United States Patent
Suzuki et al.

(10) Patent No.: US 12,103,485 B2
(45) Date of Patent: Oct. 1, 2024

(54) AIRBAG

(71) Applicant: TOYODA GOSEI CO., LTD., Kiyosu (JP)

(72) Inventors: Yuya Suzuki, Kiyosu (JP); Tsutomu Ishii, Kiyosu (JP); Koji Kawamura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 401 days.

(21) Appl. No.: 17/703,378

(22) Filed: Mar. 24, 2022

(65) Prior Publication Data

US 2022/0306037 A1  Sep. 29, 2022

(30) Foreign Application Priority Data

Mar. 29, 2021  (JP) .................... 2021-056095

(51) Int. Cl.
*B60R 21/231* (2011.01)
*B60R 21/203* (2006.01)
*B60R 21/2338* (2011.01)

(52) U.S. Cl.
CPC .......... *B60R 21/231* (2013.01); *B60R 21/203* (2013.01); *B60R 21/2338* (2013.01)

(58) Field of Classification Search
CPC .. B60R 21/231; B60R 21/203; B60R 21/2338
See application file for complete search history.

(56) References Cited

U.S. PATENT DOCUMENTS

| | | | | |
|---|---|---|---|---|
| 5,529,340 | A | * | 6/1996 | Fairbanks ............. B60R 21/231 280/743.1 |
| 5,975,571 | A | * | 11/1999 | Ford .................... B60R 21/231 280/743.1 |
| 6,086,092 | A | * | 7/2000 | Hill ..................... B60R 21/2338 280/743.2 |

(Continued)

FOREIGN PATENT DOCUMENTS

| | | |
|---|---|---|
| CA | 2142446 A1 | 3/1994 |
| JP | H08-500638 A | 1/1996 |

(Continued)

OTHER PUBLICATIONS

Office Action dated Aug. 29, 2023 issued in corresponding JP patent application No. 2021-056095 (and Machine translation).

*Primary Examiner* — Toan C To
(74) *Attorney, Agent, or Firm* — Posz Law Group, PLC

(57) ABSTRACT

An airbag includes a plurality of base materials made of a sheet body. The base materials include: an occupant side panel; a vehicle body side panel; a front side panel; and a rear side panel. Corresponding edge portions of the occupant side panel, the vehicle body side panel, the front side panel and the rear side panel are configured to be joined to each other by a planar joining operation. Outer peripheral edges of the front side panel and the rear side panel are joined to corresponding edge portions of the vehicle body side panel and the occupant side panel, respectively. The front side panel and the rear side panel are separated from each other on a front-rear direction side, when the inflation is completed, by joining corresponding left and right edges of the vehicle body side panel and the occupant side panel to each other.

4 Claims, 8 Drawing Sheets

(56) References Cited

U.S. PATENT DOCUMENTS

| | | | |
|---|---|---|---|
| 7,000,943 B2* | 2/2006 | Hasebe | B60R 21/233 280/743.2 |
| 7,073,818 B2* | 7/2006 | Hasebe | B60R 21/233 280/743.1 |
| 7,111,866 B2* | 9/2006 | Abe | B60R 21/233 280/729 |
| 7,380,822 B2* | 6/2008 | Abe | B60R 21/233 280/743.1 |
| 7,503,582 B2* | 3/2009 | Sendelbach | B60R 21/233 280/743.1 |
| 7,673,899 B2* | 3/2010 | Abe | B60R 21/233 280/743.2 |
| 8,955,879 B2* | 2/2015 | Aranzulla | B60R 21/231 280/743.1 |
| 9,027,956 B2* | 5/2015 | Yamaji | B60R 21/203 280/743.1 |
| 9,555,764 B2* | 1/2017 | Hiruta | B60R 21/239 |
| 2003/0020264 A1* | 1/2003 | Abe | B60R 21/233 280/729 |
| 2005/0116455 A1* | 6/2005 | Abe | B60R 21/233 280/743.1 |
| 2018/0354447 A1 | 12/2018 | Nakajima et al. | |
| 2020/0101928 A1 | 4/2020 | Ishii et al. | |

FOREIGN PATENT DOCUMENTS

| | | |
|---|---|---|
| JP | 2018-020737 A | 2/2018 |
| JP | 2019-142510 A | 8/2019 |
| JP | 2020-050182 A | 4/2020 |

* cited by examiner

AIRBAG

CROSS-REFERENCE TO RELATED APPLICATION(S)

This application is based upon and claims the benefit of priority from prior Japanese patent application No. 2021-056095 filed on Mar. 29, 2021, the entire contents of which are incorporated herein by reference.

BACKGROUND

1. Field of the Invention

The present invention relates to an airbag that is folded and housed in a housing portion and is inflated to protect an occupant seated on a seat by causing inflation gas to flow into the airbag.

2. Description of the Related Art

In the related art, an airbag is configured to inflate so as to cover the entire surface of an upper surface of a steering wheel for protecting an occupant seated in a driver seat (see, for example, JP-A-2018-20737). The airbag includes a driver side wall portion disposed on a driver side when inflation is completed, a vehicle body side wall portion disposed on a steering wheel side, and a side wall portion disposed between the driver side wall portion and the vehicle body side wall portion, and has a substantially truncated cone shape as an inflation completion shape.

In the airbag in the related art, although the inflation completion shape is the truncated cone shape, the vehicle body side wall portion is disposed to be curved so as to raise a peripheral edge when the inflation is completed, a gap is generated between the vicinity of the peripheral edge of the vehicle body side wall portion and the steering wheel, and there is room for improvement in that the occupant is quickly protected.

SUMMARY

An object of the present invention is to provide an airbag capable of protecting an occupant quickly and stably.

According to an aspect of the present invention, there is provided an airbag that is folded and housed in a housing portion and is inflated to protect an occupant seated on a seat by causing inflation gas to flow into the airbag, where: the airbag is formed into a bag shape by joining peripheral edges of a plurality of base materials made of a sheet body having flexibility; the base materials include: an occupant side panel disposed on the occupant side when the inflation is completed; a vehicle body side panel disposed on a vehicle body side when the inflation is completed; a front side panel forming a region on a front end side when the inflation is completed; and a rear side panel forming a region on a rear end side when the inflation is completed; corresponding edge portions of the occupant side panel, the vehicle body side panel, the front side panel and the rear side panel are configured to be joined to each other by a planar joining operation; the occupant side panel and the vehicle body side panel are set to have substantially the same outer shape; the outer shape of the front side panel and the rear side panel is a substantially elliptical shape having a major axis substantially along a left-right direction; outer peripheral edges of the front side panel and the rear side panel are joined to corresponding edge portions of the vehicle body side panel and the occupant side panel, respectively; and the front side panel and the rear side panel are separated from each other on a front-rear direction side, when the inflation is completed, by joining corresponding left and right edges of the vehicle body side panel and the occupant side panel to each other.

The airbag of the present invention is formed by four members of the occupant side panel, the vehicle body side panel, the front side panel, and the rear side panel. In the region on the front end side and the region on the rear end side when the inflation is completed, the vehicle body side panel and the occupant side panel are not directly joined at the edge portions, and the front side panel and the rear side panel are interposed therebetween to form an outer peripheral wall. Further, the front side panel and the rear side panel are disposed to be separated from each other on the front-rear direction side when the inflation of the airbag is completed. That is, in the airbag of the present invention, since the joining portion for directly joining the vehicle body side panel to the occupant side panel is not disposed in the region on the front end side and the region on the rear end side when the inflation is completed, on the front edge side and the rear edge side of the vehicle body side panel when the inflation is completed, a tensile force that pulls the vehicle body side panel toward the occupant side panel side does not act unlike an intermediate portion (the region in which the left edges are directly joined to each other or the right edges are directly joined to each other) in the front-rear direction pulled toward the occupant side panel side. The region on the front end side and the region on the rear end side of the vehicle body side panel when the inflation is completed becomes a state in which the region on the front end side and the region on the rear end side are pushed down so as to be separated from the occupant side panel side by the addition of a film length of the front side panel or the rear side panel. It is possible to prevent the region on the front end side and the region on the rear end side from being disposed so as to rise from the vehicle body side member forming the peripheral edge of the housing portion. Therefore, in the airbag of the present invention, the region on the front end side and the region on the rear end side when the inflation is completed can be inflated so as to be brought into close contact with the vehicle body side member of the peripheral edge of the housing portion. Therefore, when the occupant is received when the inflation is completed, the region on the front end side and the region on the rear end side can be rapidly supported by the vehicle body side member, a reaction force from the vehicle body side member can be secured, and the occupant can be rapidly and stably received.

Therefore, in the airbag of the present invention, the occupant can be quickly and stably protected.

Further, the airbag of the present invention can be manufactured by joining the edge portions corresponding to the occupant side panel, the vehicle body side panel, the front side panel, and the rear side panel to each other by a planar joining operation, and there is no need for three-dimensional joining operation, and the airbag can be easily manufactured.

Further, in the airbag of the present invention, it is preferable that a left side joining portion and a right side joining portion, which are formed by joining corresponding left and right edges of the vehicle body side panel and the occupant side panel to each other, are disposed in a linear shape substantially along a front-rear direction when the inflation is completed, Since an increase in a width dimension of the airbag in a left-right direction side when the inflation is completed can be prevented, an unnecessary increase in a volume of the airbag can be prevented, and the airbag can be inflated so as to thickly cover the peripheral edge of the housing portion.

Further, in the airbag having the above-described configuration, since the tether that regulates the separation distance in the up-down direction side between the occupant side panel and the vehicle body side panel when the inflation is completed is disposed inside the airbag, it is possible to prevent the occupant side panel from being disposed excessively separated from the vehicle body side panel when the inflation is completed, which is preferable.

Furthermore, in the airbag having the above-described configuration, when the base material is formed of a woven fabric, and both the front side panel and the rear side panel are cut such that a warp or a weft is substantially along the front-rear direction when the inflation is completed, the front side panel and the rear side panel are unlikely to extend more than necessary at the time of inflation of the airbag, a high repulsive force is secured, large deformation at the time of receiving the occupant can be prevented, and the occupant can be stably received without increasing a receiving stroke, which is preferable.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
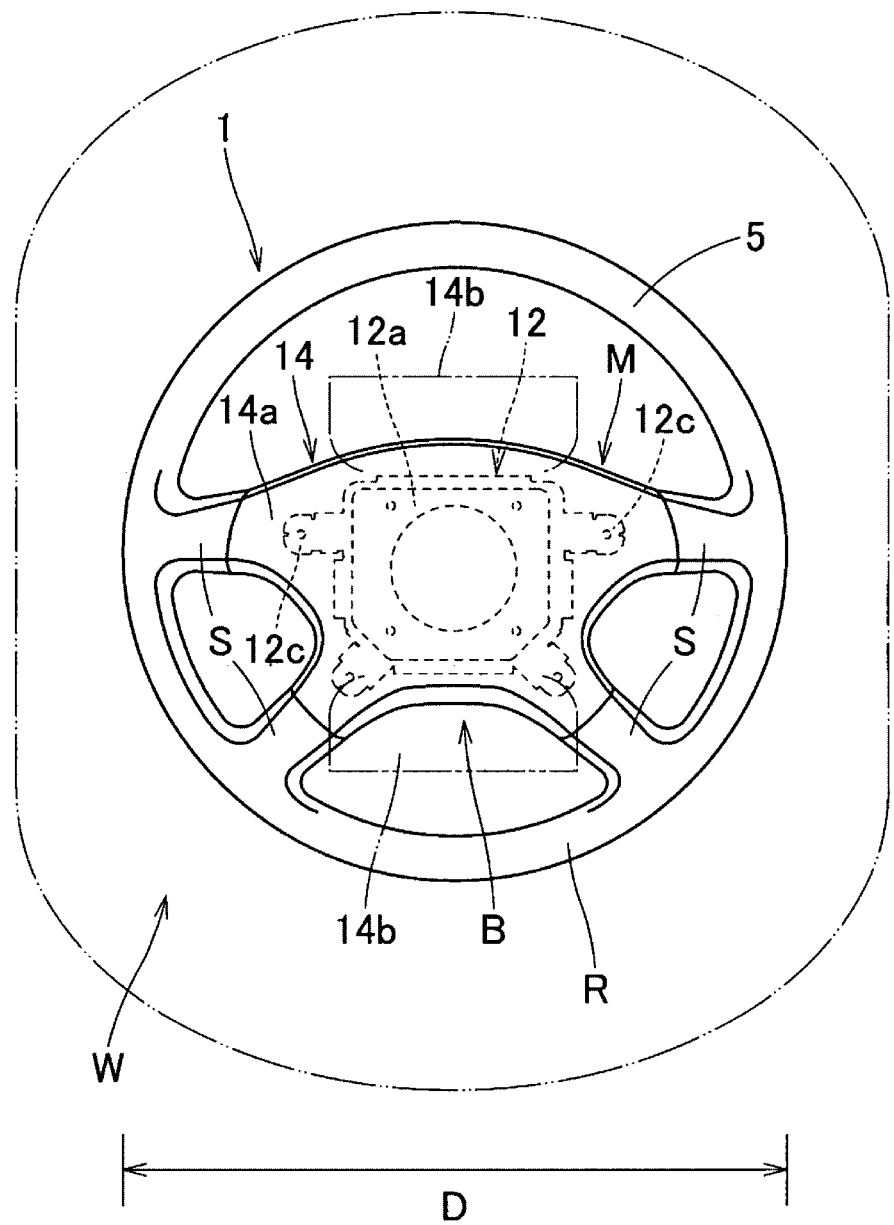
FIG. 1 is a schematic plan view showing a handle airbag device using an airbag according to an embodiment of the present invention.
Figure 2:
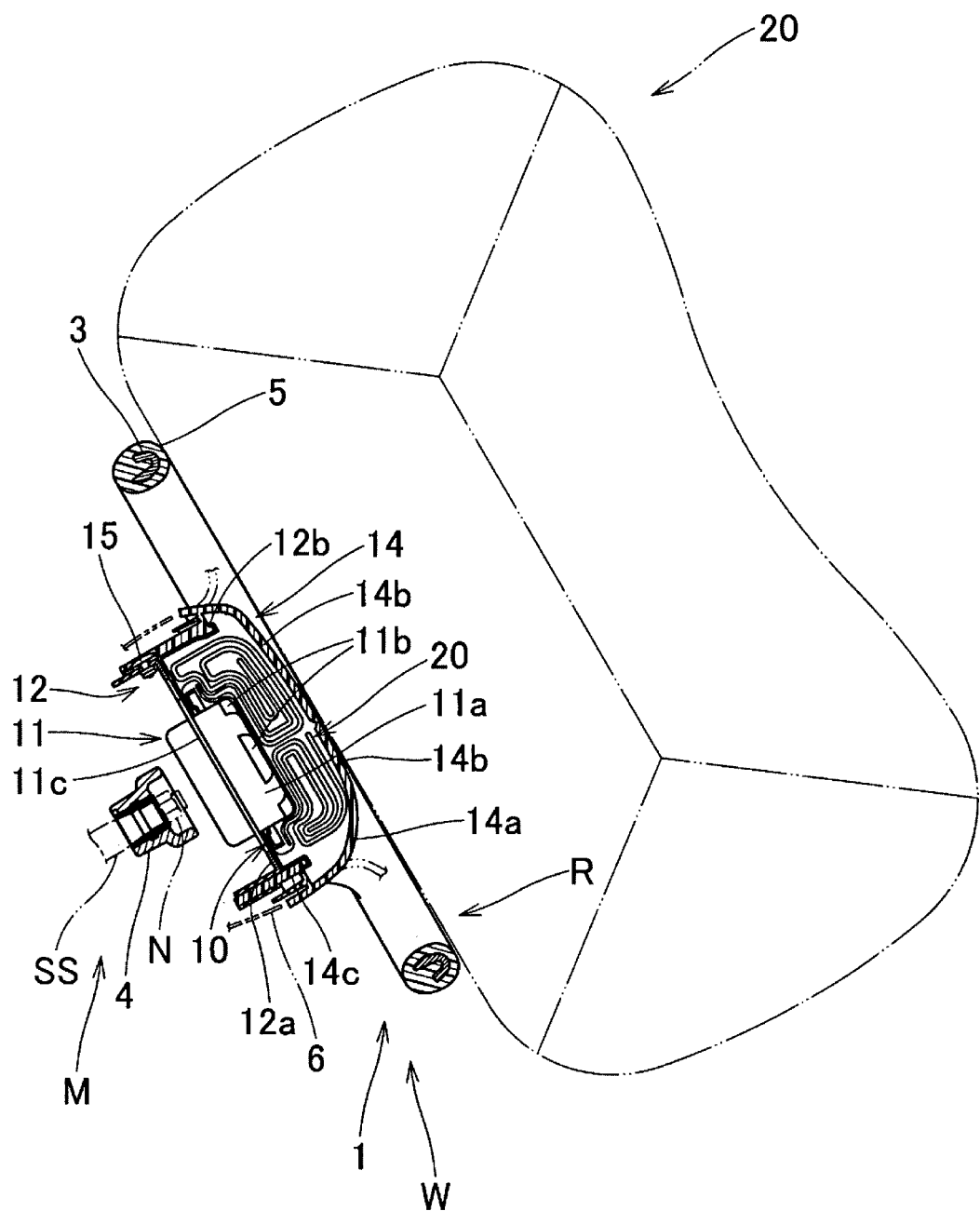
FIG. 2 is a schematic longitudinal sectional view of the handle airbag device of FIG. 1 when the handle airbag device is mounted on a vehicle.

Hereinafter, an embodiment of the present disclosure will be described with reference to the drawings. In the embodiment, an airbag 20 for a handle will be described as an example. The airbag 20 is used in a handle airbag device (hereinafter, abbreviated as "airbag device") M mounted on a handle W as shown in FIGS. 1 and 2. The handle W includes a handle body 1 and the airbag device M disposed above a boss portion B at the center of the handle body 1. In the case of the embodiment, the handle body 1 includes a substantially annular ring portion R that is gripped when a vehicle is steered, the boss portion B that is disposed at a substantially center of the ring portion R and is connected to a shaft SS, and four spoke portions S that connect the boss portion B and the ring portion R. In the embodiment, unless otherwise specified, the front-rear, up-down, and left-right directions are based on the straight steering of the handle W mounted on the vehicle, and indicate front-rear, up-down, and left-right directions, in which the up-down along an axial direction of the shaft SS (see FIG. 2) to which the handle W is attached is defined as an up-down direction, the front-rear of the vehicle, which is a direction orthogonal to the axis of the shaft SS, is defined as a front-rear direction, and the left-right of the vehicle, which is a direction orthogonal to the axis of the shaft SS, is defined as a left-right direction.

As shown in FIGS. 1 and 2, the handle body 1 includes a core metal 3 made of a metal such as an aluminum alloy and disposed to connect the ring portion R, the boss portion B, and each of the spoke portions S. A covering layer 5 made of a synthetic resin covers a part of the ring portion R of the core metal 3 and a part of each spoke portion S on the ring portion R side. Further, a steel boss 4 for inserting the shaft SS and fixing a nut N is disposed on a part of the boss portion B of the core metal 3. Furthermore, a lower cover 6 made of a synthetic resin and covering a lower side of the boss portion B is disposed on a lower portion of the handle body 1.

As shown in FIG. 1, the airbag device M is disposed on the boss portion B at a substantially center of the handle W, and includes the airbag 20 that is folded and housed, an inflator 11 that supplies an inflation gas into the airbag 20, a case 12 as a housing portion that houses and holds the airbag 20 and the inflator 11, an airbag cover 14 that covers the folded airbag 20, and a retainer 10 for attaching the airbag 20 and the inflator 11 to the case 12.

As shown in FIG. 2, the inflator 11 includes a substantially columnar main body portion 11a having a plurality of gas discharge ports 11b, and a flange portion 11c for attaching the inflator 11 to the case 12. A through hole (not shown) through which each bolt (not shown) of the retainer 10 passes is formed in the flange portion 11c.

As shown in FIG. 2, the case 12 as a housing portion is made of a sheet metal and includes a substantially rectangular bottom wall portion 12a to which the inflator 11 is inserted and attached from below and a peripheral wall portion 12b extending vertically from an outer peripheral edge of the bottom wall portion 12a. An attachment piece 12c extending outward is formed at an upper end of the peripheral wall portion 12b (see FIG. 1), and an attachment substrate of a horn switch mechanism (not shown) is attached to the attachment piece 12c. Then, the case 12 is attached and fixed to the core metal 3 of the handle W by using the attachment substrate (not shown), and the airbag device M is mounted on an upper portion of the boss portion B of the handle body 1 which has been attached to the shaft SS. Further, a side wall portion 14c of the airbag cover 14 is attached to the peripheral wall portion 12b of the case 12 using a rivet 15 and the like (see FIG. 2). In the case of the embodiment, the airbag 20 and the inflator 11 are attached to the bottom wall portion 12a of the case 12 by using a bolt (not shown) of the retainer 10 disposed in the airbag 20 as an attachment unit, passing the bolt (not shown) through an attachment hole in a peripheral edge of an inflow opening (described later) of the airbag 20, the bottom wall portion 12a of the case 12, and the flange portion 11c of the inflator 11, and fixing the bolt with a nut (not shown).

The airbag cover 14 is made of a synthetic resin and includes a ceiling wall portion 14a that covers the upper side of the airbag 20 housed in the case 12, and the side wall portion 14c that has a substantially rectangular tube shape and extends downward from the vicinity of an outer peripheral edge of the ceiling wall portion 14a. The ceiling wall portion 14a is formed with two door portions 14b and 14b that are pushed by the inflating airbag 20 and open in the front-rear direction.

The airbag 20 includes a bag body 21 having a bag shape and a tether 45 that regulates an inflation completion shape of the bag body 21.

Figure 3:
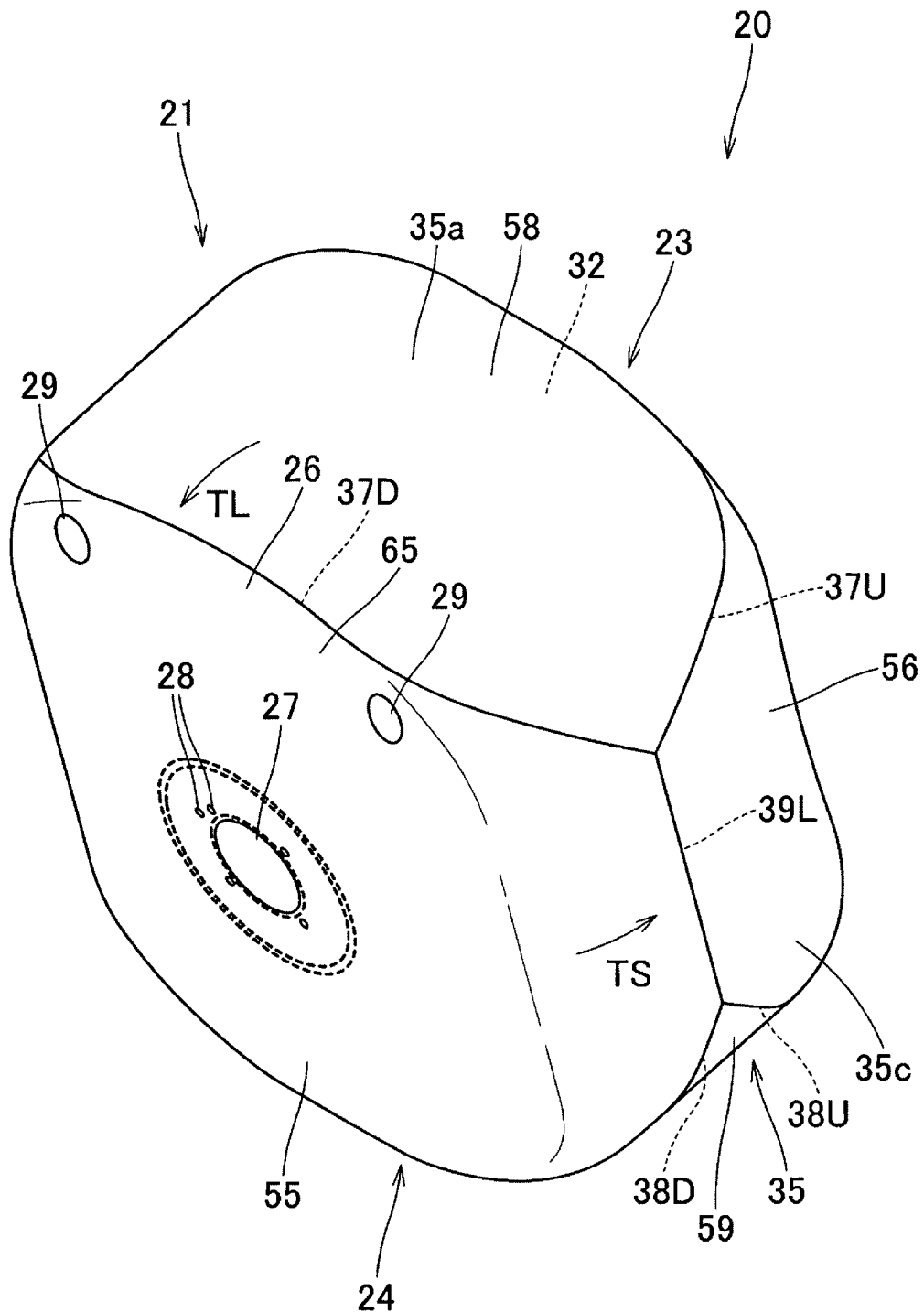
FIG. 3 is a schematic perspective view of a state in which an airbag used in the handle airbag device of FIG. 1 is inflated alone.
Figure 4:
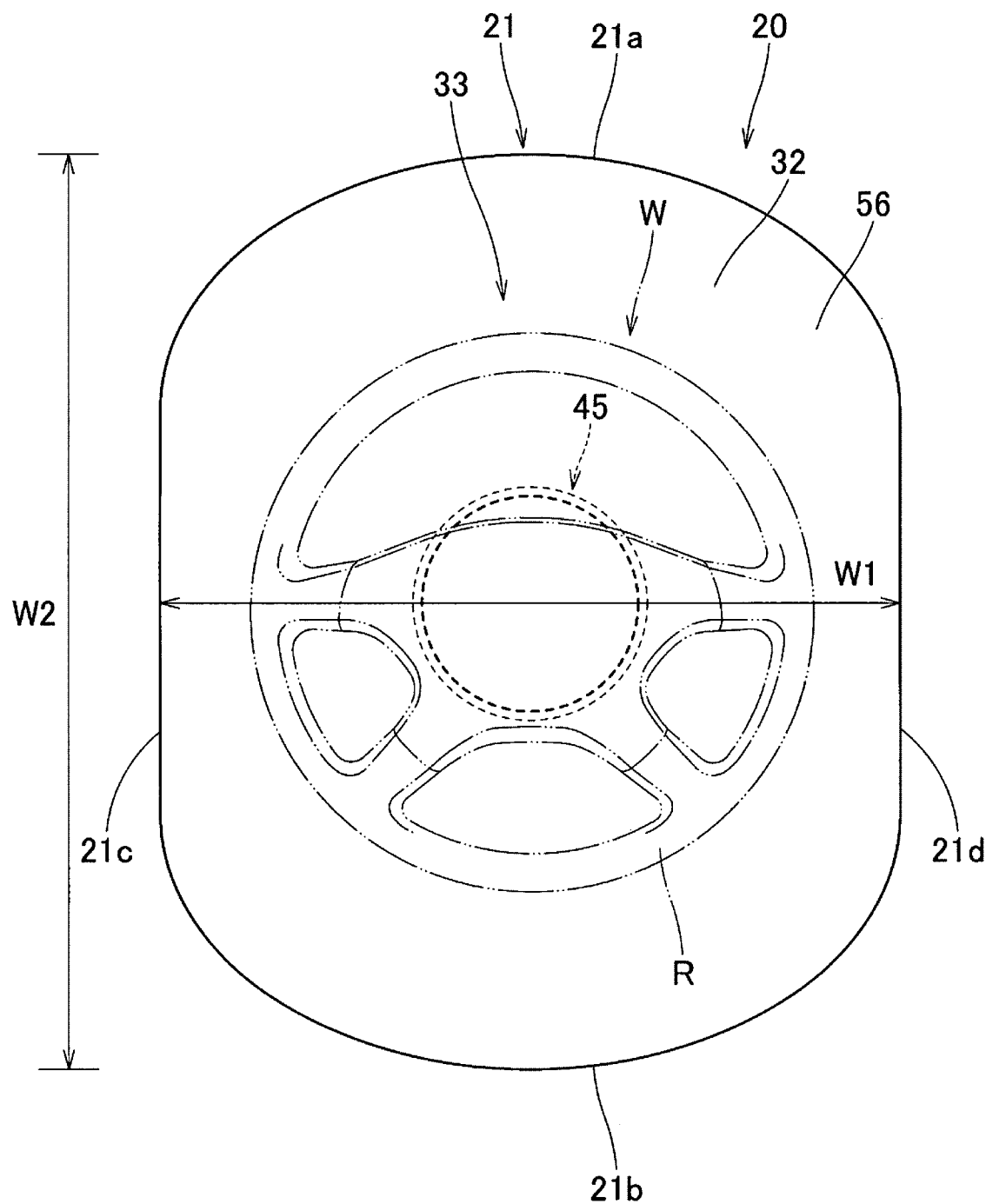
FIG. 4 is a plan view of the airbag of FIG. 3.

As shown by the two-dot chain lines in FIGS. 1 and 2, the bag body 21 is disposed so as to cover substantially the entire upper surface of the ring portion R of the handle W as a vehicle body side member when the inflation is completed. In the case of the embodiment, the inflation completion shape is formed in a substantially ellipse shape in which the front-rear direction side is wide when viewed from the up-down direction side, and the thickness is substantially constant over the entire front-rear direction when viewed from the left-right direction side (see FIGS. 3 to 6). Specifically, as shown in FIG. 4, for the inflation completion shape when viewed from the up-down direction side, the bag body 21 has a substantially oval shape, in which a front edge 21a and a rear edge 21b are curved in a substantially arc shape, and a left edge 21c and a right edge 21d are in a substantially linear shape along the front-rear direction. In the case of the embodiment, the bag body 21 is formed such that the outer shape when the inflation is completed is substantially symmetrical in the front-rear and left-right directions.

The bag body 21 includes an occupant side wall portion 32 disposed on a driver MD side as an occupant when the inflation is completed, a vehicle body side wall portion 26 disposed on the handle W side which is the vehicle body side when the inflation is completed, and a side wall portion 35 disposed so as to connect outer peripheral edges of the occupant side wall portion 32 and the vehicle body side wall portion 26 to each other. In the bag body 21 of the embodiment, in the inflation completion state, the side wall portion 35 is formed to have a substantially constant width dimension over substantially the entire area in the front-rear and left-right directions. The occupant side wall portion 32 and the vehicle body side wall portion 26 are formed to have substantially the same outer shape, have a substantially ellipse shape (substantially oval shape) having a wide width in the front-rear direction side, and are disposed substantially parallel to each other so as to be substantially along a ring surface RF of the handle W. Further, in the bag body 21 of the embodiment, in a region of the side wall portion 35, a joining portion formed by joining edge portions corresponding to an occupant side panel 56, a vehicle body side panel 55, a front side panel 58, and a rear side panel 59 to each other, which form the bag body 21 and will be described later, is disposed. Specifically, in the side wall portion 35, a left side joining portion 39L and a right side joining portion 39R are disposed on portions on the center side in the front-rear direction of a left wall portion 35c and a right wall portion 35d facing each other on the left-right direction side, respectively, and are in a linear shape substantially along the front-rear direction (the ring surface RF) at substantially centers of the left wall portion 35c and the right wall portion 35d in the up-down direction (see FIG. 8). Two of a front upper joining portion 37U and a front lower joining portion 37D are disposed in a region from a peripheral edge of a front wall portion 35a of the side wall portion 35 to the front side of the left wall portion 35c and the right wall portion 35d so as to connect front ends of the left side joining portion 39L and the right side joining portion 39R to each other. Similarly, two of a rear upper joining portion 38U and a rear lower joining portion 38D are disposed in a region from a peripheral edge of a rear wall portion 35b of the side wall portion 35 to the rear side of the left wall portion 35c and the right wall portion 35d so as to connect rear ends of the left side joining portion 39L and the right side joining portion 39R to each other (see FIGS. 3 and 5). That is, the front upper joining portion 37U and the front lower joining portion 37D respectively form boundary portions between the front wall portion 35a and the vehicle body side wall portion 26 or between the front wall portion 35a and the occupant side wall portion 32. The rear upper joining portion 38U and the rear lower joining portion 38D respectively form boundary portions between the rear wall portion 35b and the vehicle body side wall portion 26 or between the rear wall portion 35b and the occupant side wall portion 32.

In the vehicle body side wall portion 26, an inflow opening 27 for inserting the main body portion 11a of the inflator 11 from below and allowing the inflation gas discharged from the gas discharge port 11b of the inflator 11 to flow into the inside is formed in a substantially circular shape in a substantially central position in the front-rear and left-right directions. Further, four attachment holes 28 through which bolts (not shown) of the retainer 10 are inserted are formed in the peripheral edge of the inflow opening 27 in the vehicle body side wall portion 26. Furthermore, in the vehicle body side wall portion 26, vent holes 29 and 29 for discharging excess inflation gas flowing into the bag body 21 are formed at two bilaterally symmetrical positions in a region in the vicinity of the front end which is in front of the inflow opening 27 (a lower surface side of a front end side portion 23 of the bag body 21).

Figure 5:
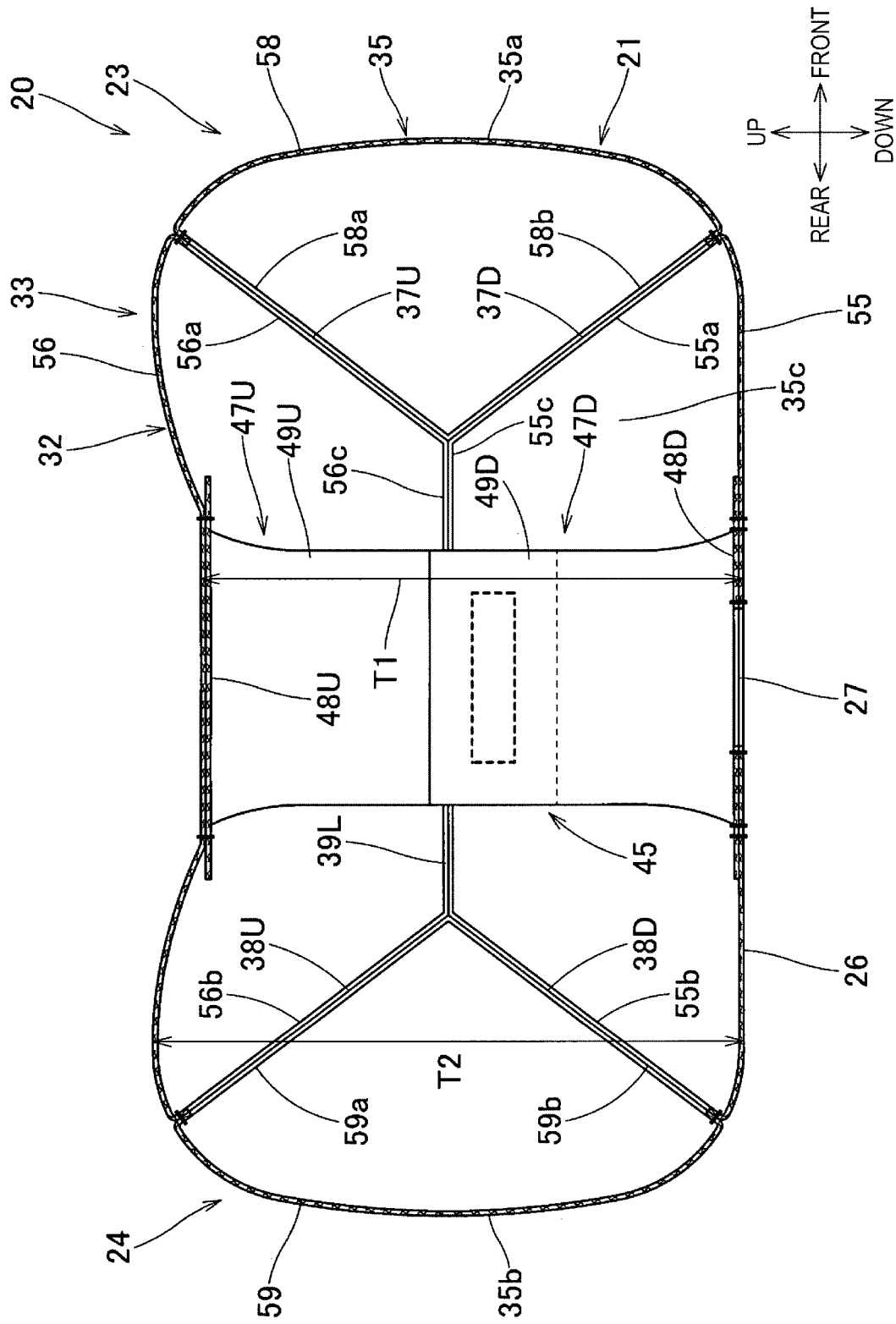
FIG. 5 is a schematic longitudinal sectional view of the airbag of FIG. 3 taken along a front-rear direction.
Figure 6:
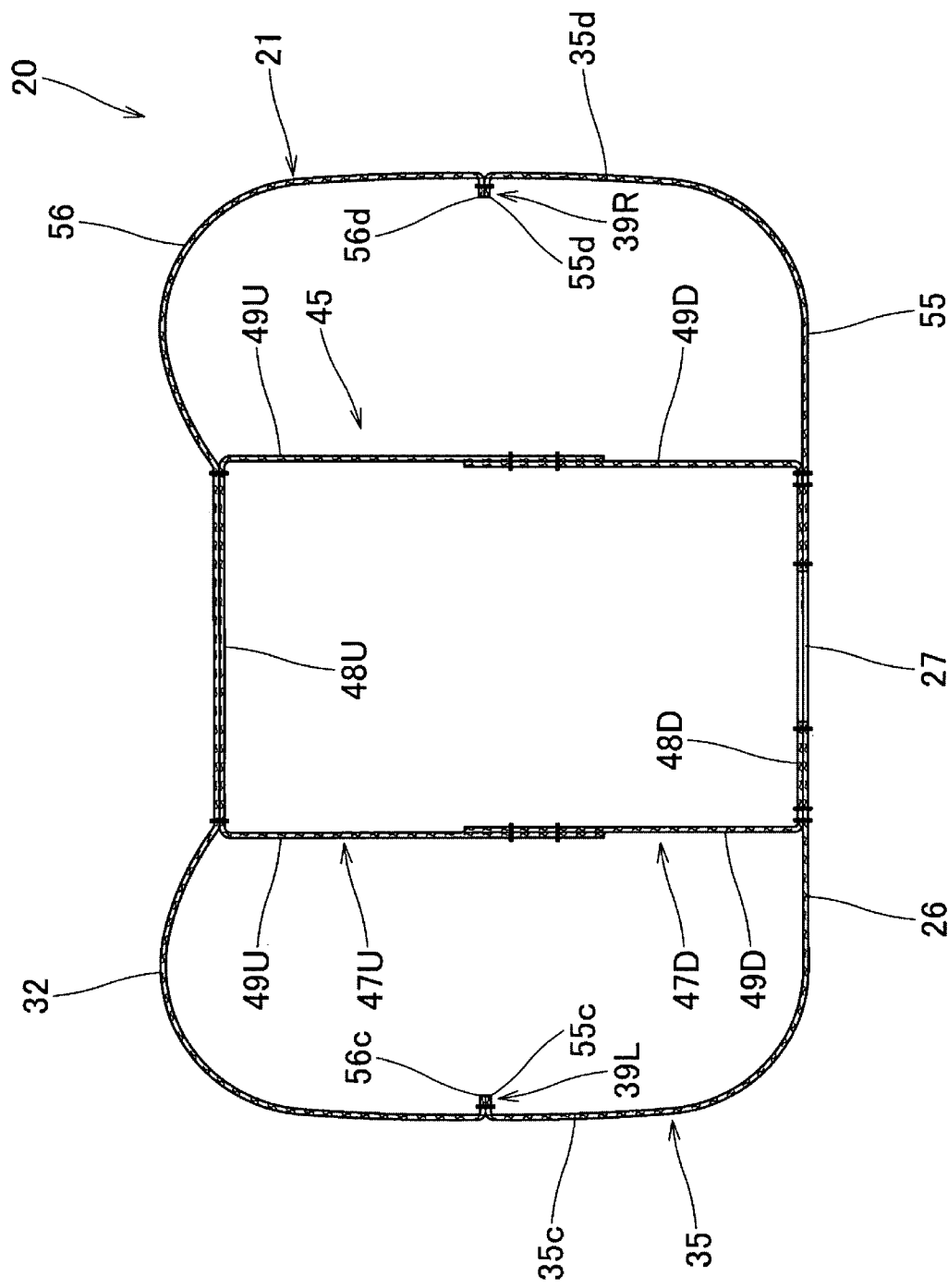
FIG. 6 is a schematic longitudinal sectional view of the airbag of FIG. 3 taken along a left-right direction.

In the airbag 20 of the embodiment, as will be described later, since the tether 45 is disposed so as to connect the substantially center of the vehicle body side wall portion 26 in the front-rear and left-right directions (in the vicinity of the inflow opening 27) and the substantially center of the occupant side wall portion 32 in the front-rear and left-right directions, the occupant side wall portion 32 is disposed such that the center of the occupant side wall portion 32 in the front-rear and left-right directions is positioned closer to the vehicle body side wall portion 26 side than the other region (relatively slightly recessed) when the inflation of the bag body 21 is completed (see FIG. 5). Then, the occupant side wall portion 32 is formed such that a front side central region 33 that is positioned in front of the tether 45 when the inflation is completed is disposed so as to be inclined with respect to the ring surface RF of the handle W (see FIG. 8). The front side central region 33 of the occupant side wall portion 32 is a region that is positioned in front of a head portion MH of the driver MD (occupant) and receives the head MH when the inflation is completed, and is disposed so as to be inclined with respect to the ring surface RF so as to be closer to a vertical direction than the ring surface RF. In the case of the embodiment, the front side central region 33 is disposed so as to be substantially along the head portion MH.

As shown in FIG. 4, in the bag body 21 of the embodiment, a width dimension W1 on the left-right direction side when the inflation is completed is set to be larger than a ring diameter D (see FIG. 1) of the ring portion R of the handle W, and a width dimension W2 on the front-rear direction side when the inflation is completed is set to be larger than the width dimension W1 on the left-right direction side. Specifically, the width dimension W1 on the left-right direction side when the inflation of the bag body 21 is completed is set to about ⅔ of the ring diameter D of the ring portion R, and the width dimension W2 on the front-rear direction side is set to about ⅝ of the width dimension W1 on the left-right direction side. Further, a thickness dimension of the bag body 21 is substantially constant over substantially the entire area in the front-rear direction, but a thickness dimension T1 in the vicinity of the center in the front-rear direction is set to be slightly smaller than a thickness dimension T2 of the front end side portion 23 and a rear end side portion 24 (see FIG. 5).

Figure 7:
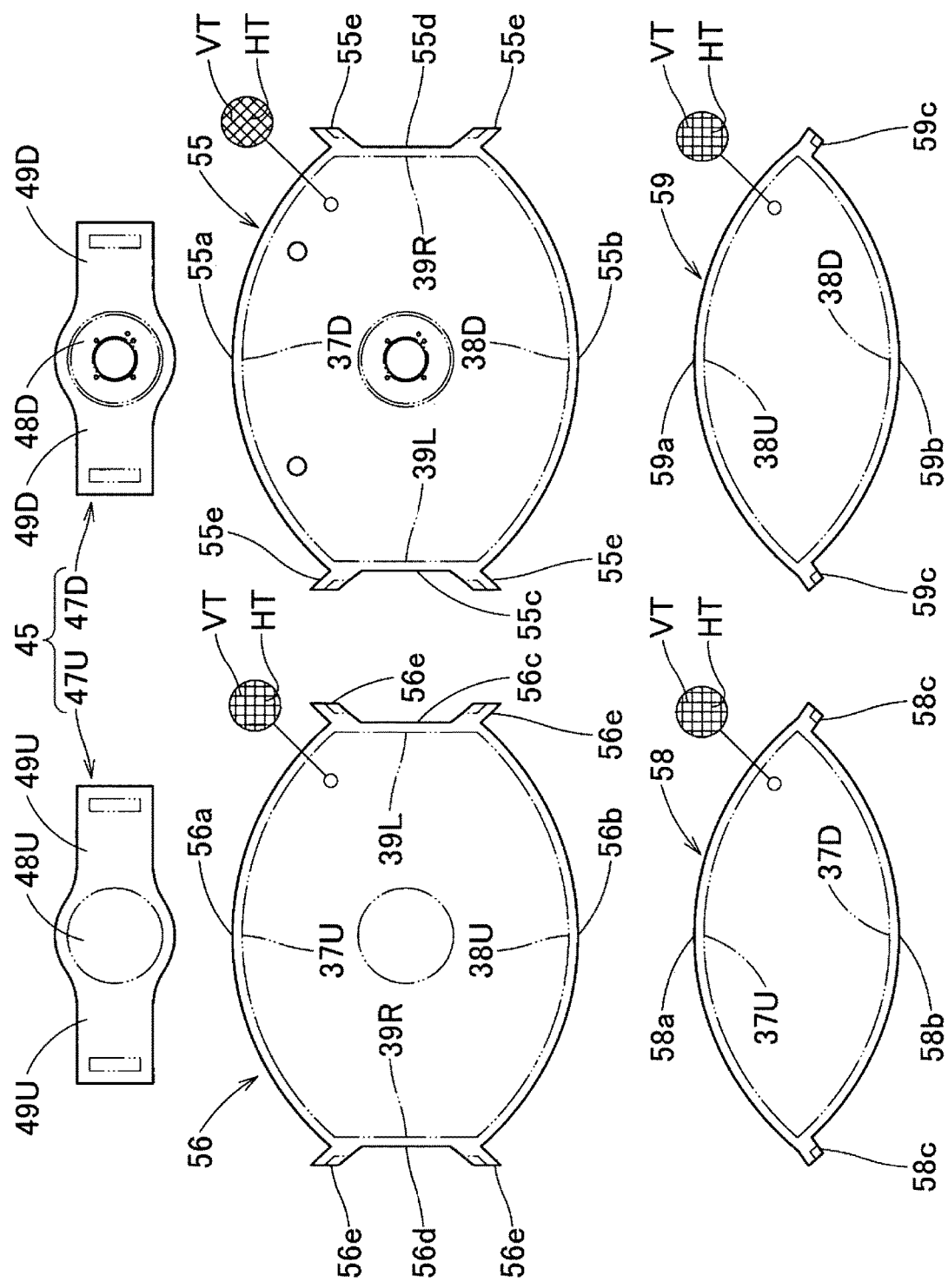
FIG. 7 is a plan view showing a state in which base materials forming the airbag of FIG. 3 are arranged side by side.

The tether 45 disposed in the bag body 21 is disposed so as to connect the peripheral edge of the inflow opening 27 in the vehicle body side wall portion 26 and the vicinity of the center of the occupant side wall portion 32 in the front-rear and left-right directions, and regulates a separation distance between the vicinity of the center of the occupant side wall portion 32 and the peripheral edge of the inflow opening 26 when the inflation is completed. In the case of the embodiment, the tether 45 is formed at two positions on both left and right sides of the inflow opening 27. The tether 45 includes two tether base materials 47U and 47D as shown in FIG. 7. The tether base materials 47U and 47D are respectively formed to include attachment side portions 48U and 48D that are joined to the vehicle body side wall portion 26 side and the occupant side wall portion 32 side, and two tether configuration portions 49U and 49D that extend from the outer peripheral edges of the attachment side portions 48U and 48D. The tether 45 is formed by joining end portions of the corresponding tether configuration portions 49U and 49D to each other in a state in which the attachment side portions 48U and 48D are joined to the vehicle body side wall portion 26 side and the occupant side wall portion 32 side.

The bag body 21 of the embodiment is formed in a bag shape by joining peripheral edges of a plurality of base materials made of a sheet body having flexibility. In the case of the embodiment, as shown in FIG. 7, the bag body 21 is formed by four base materials including the occupant side panel 56 disposed on the driver MD side as an occupant when the inflation is completed, the vehicle body side panel 55 disposed on the handle W side as the vehicle body side when the inflation is completed, the front side panel 58 forming a region on the front end side of the bag body 21 when the inflation is completed, and the rear side panel 59 forming a region on the rear end side of the bag body 21 when the inflation is completed. The occupant side panel 56, the vehicle body side panel 55, the front side panel 58, and the rear side panel 59 are formed such that the corresponding edge portions can be joined to each other by planar joining (sewing) work.

The outer shapes of the occupant side panel 56 and the vehicle body side panel 55 are set to be substantially the same, and the occupant side panel 56 and the vehicle body side panel 55 have a substantially barrel shape that is wide in the left-right direction side (see FIG. 7). The outer shapes of the front side panel 58 and the rear side panel 59 are set to be substantially the same, and the front side panel 58 and the rear side panel 59 are formed in a substantially elliptical shape with a major axis substantially along the left-right direction. Specifically, in the occupant side panel 56 and the vehicle body side panel 55, front edges 55a and 56a and rear edges 55b and 56b are respectively curved in a substantially arc shape having the same curvature, and left edges 55c and 56c and right edges 55d and 56d are respectively formed in a substantially linear shape along the front-rear direction, and are formed in a substantially barrel shape symmetrical in the front-rear and left-right directions. The occupant side panel 56 forms the occupant side wall portion 32 and a region of the side wall portion 35 which is approximately the upper half of the left wall portion 35c and the right wall portion 35d. The vehicle body side panel 55 forms the vehicle body side wall portion 26 and a region of the side wall portion 35 which is approximately the lower half of the left wall portion 35c and the right wall portion 35d. Each of the front side panel 58 and the rear side panel 59 has a substantially vertically symmetrical lens shape (convex lens shape) in which upper edges 58a and 59a and lower edges 58b and 59b are curved in a substantially arc shape having the same curvature (see FIG. 7). The front side panel 58 forms a region of the front wall portion 35a in the side wall portion 35, and the rear side panel 59 forms a region of the rear wall portion 35b in the side wall portion 35. The upper edges 58a and 59a and the lower edges 58b and 59b of the front side panel 58 and the rear side panel 59 are formed to have the same curved shapes as the front edges 55a and 56a and the rear edges 55b and 56b of the corresponding occupant side panel 56 and the vehicle body side panel 55. The width dimensions in the left-right direction side of the occupant side panel 56, the vehicle body side panel 55, the front side panel 58, and the rear side panel 59 are the same. Further, in the embodiment, tab portions 55e, 56e, 58c, and 59c are disposed at four corners of the occupant side panel 56 and the vehicle body side panel 55, and at both edges 49 of the front side panel 58 and the rear side panel 59. The tab portions 55e, 56e, 58c, and 59c are folded and sewn together during the joining operation of the edge portions corresponding to the occupant side panel 56, the vehicle body side panel 55, the front side panel 58, and the rear side panel 59, are disposed at portions of intersection points (specifically, four intersection points of the front upper joining portion 37U, the front lower joining portion 37D, the rear upper joining portion 38U, the rear lower joining portion 38D, the left side joining portion 39L, and the right side joining portion 39R) of joining portions formed by sewing (joining) the edge portions corresponding to the occupant side panel 56, the vehicle body side panel 55, the front side panel 58, and the rear side panel 59, and are disposed to reinforce portions in the vicinity of these intersection points.

In the embodiment, the occupant side panel 56, the vehicle body side panel 55, the front side panel 58, and the rear side panel 59 forming the bag body 21, and the tether base materials 47U and 47D forming the tether 45 are each formed of a flexible woven fabric woven by plain weaving and the like using warp yarns and weft yarns made of polyester yarns, polyamide yarns, and the like. Specifically, in the case of the embodiment, as shown in FIG. 7, the vehicle body side panel 55 is formed by cutting such that a warp VT and a weft HT are along a bias direction (so as to intersect at an angle of 45°). The occupant side panel 56, the front side panel 58, and the rear side panel 59 are formed by cutting such that the warp VT is substantially along the front-rear direction and the weft HT is substantially along the left-right direction.

Next, manufacturing of the airbag 20 of the embodiment will be described. The attachment side portion 48D of the tether base material 47D is overlapped on the vehicle body side panel 55, sewn using a sewing thread at a portion to be the peripheral edge of the inflow opening 27, and the inflow opening 27 and the attachment hole 28 are formed by a hole forming process. The attachment side portion 48U of the tether base material 47U is sewn to the occupant side panel 56. Next, the vehicle body side panel 55 and the occupant side panel 56 are overlapped in a flatly developed state while the outer surface sides are in contact with each other, and the left edges 55c and 56c are sewn to each other and the right edges 55d and 56d are sewn to each other using sewing threads so as to form the left side joining portion 39L and the right side joining portion 39R, respectively. Thereafter, the front edges 55a and 56a side of the vehicle body side panel 55 and the occupant side panel 56 are opened such that the front edges 55a and 56a are separated from each other, the front side panel 58 is overlapped, the lower edge 58b of the front side panel 58 and the front edge 55a of the vehicle body side panel 55 are sewn using sewing threads so as to form the front lower joining portion 37D. Similarly, the upper edge 58a of the front side panel 58 and the front edge 56a of the occupant side panel 56 are sewn to form the front upper joining portion 37U. The rear edges 55b and 56b side of the vehicle body side panel 55 and the occupant side panel 56 are opened such that the rear edges 55b and 56b are separated from each other, the rear side panel 59 is overlapped, the lower edge 59b of the rear side panel 59 and the rear edge 55b of the vehicle body side panel 55 are sewn using sewing threads so as to form the rear lower joining portion 38D. Similarly, the upper edge 59a of the rear side panel 59 and the rear edge 56b of the occupant side panel 56 are sewn to form the rear upper joining portion 38U, and the bag body 21 in a bag shape can be formed. The airbag 20 can be manufactured by reversing the bag body 21 using the inflow opening 27 so as not to expose the seam allowance to the outside, and then joining the front ends of the tether configuration portions 49U and 49D to each other to form the tether 45.

The airbag 20 manufactured in this manner can be mounted on a vehicle in the following manner. First, the airbag 20 is folded so as to be able to be housed in the case 12 in a state in which the retainer 10 is disposed inside the airbag 20 such that a bolt (not shown) protrudes from the attachment hole. Thereafter, the folded airbag 20 is housed in the case 12, the main body portion 11a of the inflator 11 is inserted from below, and the inflator 11 and the airbag 20 are attached to the case 12 using a bolt (not shown) protruding from the bottom wall portion 12a and a nut. Further, the airbag device M can be assembled by covering the case 12 with the airbag cover 14, attaching the airbag cover 14 to the case 12 using the rivet 15 and the like, and then assembling the horn switch mechanism (not shown) to the attachment piece 12c of the case 12. The airbag device M can be mounted on the vehicle by attaching the airbag device M to the handle body 1, which has been fastened to the shaft SS in advance, using the attachment substrate (not shown) of the horn switch mechanism.

Figure 8:
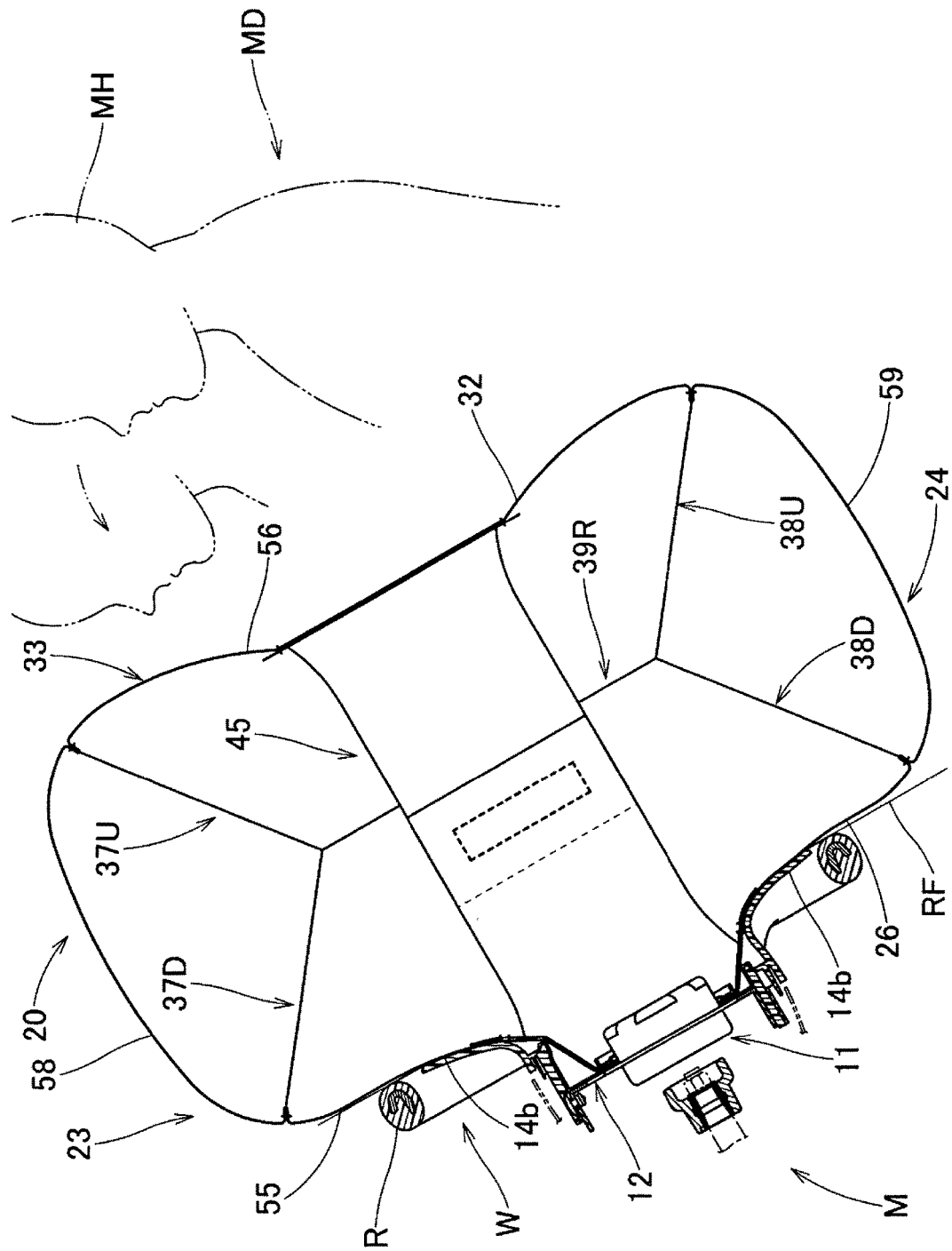
FIG. 8 is a schematic longitudinal sectional view showing a state in which the inflation of the airbag is completed in the handle airbag device of the embodiment.

In the air bag device M of the embodiment, when the inflation gas is discharged from the gas discharge port 11b of the inflator 11, the air bag 20 is inflated by causing the inflation gas to flow into the air bag 20, pushes and opens the door portions 14b and 14b of the air bag cover 14, protrudes from the case 12, and completes the inflation so as to cover substantially the entire upper surface of the handle W as shown by the two-dot chain lines in FIGS. 1 and 2 and FIG. 8.

Then, in the airbag 20 of the embodiment, the bag body 21 is formed by four members of the occupant side panel 56, the vehicle body side panel 55, the front side panel 58, and the rear side panel 59. In a region on the front end side (the front end side portion 23) and a region on the rear end side (the rear end side portion 24) when the inflation is completed, the vehicle body side panel 55 and the occupant side panel 56 are not directly joined at the edge portions, and the front side panel 58 and the rear side panel 59 are interposed therebetween to form an outer peripheral wall. Further, the front side panel 58 and the rear side panel 59 are disposed to be separated from each other on the front-rear direction side when the inflation of the airbag 20 is completed. That is, in the airbag 20 of the embodiment, since the joining portion that directly joins the vehicle body side panel 55 to the occupant side panel 56 is not disposed on the front end side portion 23 and the rear end side portion 24 when the inflation is completed, on the front edge 55a side and the rear edge 55b side of the vehicle body side panel 55 when the inflation is completed, a tensile force TS (see FIG. 3) that pulls the vehicle body side panel 55 toward the occupant side panel 56 side does not act unlike an intermediate portion (the region in which the left edges 55c and 56c are directly joined to each other or the right edges 55d and 56d are directly joined to each other) in the front-rear direction pulled toward the occupant side panel 56 side. The region on the front end side and the region on the rear end side of the vehicle body side panel 55 when the inflation is completed becomes a state in which the region on the front end side and the region on the rear end side are pushed down so as to be separated from the occupant side panel 56 side by the addition of a film length of the front side panel 58 or the rear side panel 59 (a mode in which a tensile force TL as shown in FIG. 3 acts). It is possible to prevent the front end side portion 23 and the rear end side portion 24 when the inflation is completed from being disposed so as to rise from the vehicle body side member (the ring portion R of the handle W) forming the peripheral edge of the case 12 as the housing portion. Therefore, in the airbag 20 of the embodiment, the front end side portion 23 and the rear end side portion 24 when the inflation is completed can be inflated so as to be brought into close contact with the ring portion R of the handle W which is the vehicle body side member of the peripheral edge of the housing portion (case 12). Therefore, when the driver MD as the occupant is received when the inflation is completed, the front end side portion 23 and the rear end side portion 24 can be rapidly supported by the ring portion R, a reaction force from the ring portion R can be secured, and the driver MD can be rapidly and stably received.

Therefore, in the airbag 20 of the embodiment, the driver MD as the occupant can be quickly and stably protected.

Further, the airbag 20 of the embodiment can be manufactured by joining the edge portions corresponding to the occupant side panel 56, the vehicle body side panel 55, the front side panel 58, and the rear side panel 59 to each other by a planar joining operation, and there is no need for three-dimensional joining operation, and the airbag 20 can be easily manufactured.

Further, in the airbag 20 of the embodiment, the left edges 55c and 56c and the right edges 55d and 56d of the vehicle body side panel 55 and the occupant side panel 56 are formed in a linear shape substantially along the front-rear direction. The left side joining portion 39L and the right side joining portion 39R, which are formed by joining the left edges 55c and 56c or the right edges 55d and 56d corresponding to the vehicle body side panel 55 and the occupant side panel 56 to each other, are disposed in a linear shape substantially along the front-rear direction when the inflation is completed. Therefore, an increase in the width dimension of the airbag 20 in the left-right direction side when the inflation is completed can be prevented, an unnecessary increase in a volume of the airbag 20 can be prevented, and the airbag 20 can be inflated so as to thickly cover the upper surface side of the ring portion R which is the peripheral edge of the housing portion (the case 12). If such a point is not taken into consideration, the vehicle body side panel and the occupant side panel may be formed such that, for the outer shapes of the vehicle body side panel and the occupant side panel, even if the left edge and the right edge are not formed in a substantially linear shape, for example, the left edge and the right edge are curved so as to protrude outward in the left-right direction with different curvatures from those of the front edge and the rear edge.

Furthermore, in the airbag 20 of the embodiment, since the tether 45 that regulates the separation distance in the up-down direction side between the occupant side panel 56 (the occupant side wall portion 32) and the vehicle body side panel 55 (the vehicle body side wall portion 26) when the inflation is completed is disposed inside the bag body 21, it is possible to prevent the occupant side panel 56 (the occupant side wall portion 32) from being disposed excessively separated from the vehicle body side panel 55 (the vehicle body side wall portion 26) when the inflation is completed. Further, in the airbag 20 of the embodiment, by disposing the tether 45 inside the bag body 21, the occupant side wall portion 32 is disposed such that the center of the occupant side wall portion 32 in the front-rear and left-right directions is positioned closer to the vehicle body side wall portion 26 side than the other region (relatively slightly recessed) when the inflation of the bag body 21 is completed, and the front side central region 33 positioned in front of the tether 45 when the inflation is completed is disposed so as to be inclined with respect to the ring surface RF of the handle W (see FIG. 8). The front side central region 33 of the occupant side wall portion 32 is a region that is positioned in front of the head portion MH of the driver MD (occupant) and receives the head portion MH when the inflation of the airbag 20 is completed, and is disposed to be inclined with respect to the ring surface RF so as to be closer to the vertical direction than the ring surface RF when the inflation is completed. That is, since the front side central region 33 is disposed substantially along the head portion MH, the head portion MH can be stably received by a wide surface.

Further, in the airbag 20 of the embodiment, the front side panel 58 and the rear side panel 59 made of woven fabric are both formed by cutting such that the warp VT is substantially along the front-rear direction and the weft HT is substantially along the left-right direction. Therefore, when the airbag 20 is inflated, the front side panel 58 and the rear side panel 59 forming the front end side portion 23 and the rear end side portion 24 are unlikely to extend more than necessary, a high repulsive force is secured, large deformation can be prevented at the time of receiving the driver MD, and the driver MD can be stably received without increasing a receiving stroke. If such a point is not taken into consideration, the front side panel and the rear side panel may be formed by cutting such that the warp and the weft are along the bias direction (so as to intersect at an angle of 45°).

In the embodiment, the airbag 20 for the handle is described as an example, but the airbag to which the present invention can be applied is not limited to the handle airbag, and can also be applied to, for example, an airbag used in a mid-mount type passenger seat airbag device.

What is claimed is:

1. An airbag that is folded and housed in a housing portion and is inflated to protect an occupant seated on a seat by causing inflation gas to flow into the airbag, wherein:
    the airbag is formed into a bag shape by joining peripheral edges of a plurality of base materials made of a sheet body having flexibility;
    the base materials include:
        an occupant side panel disposed on the occupant side when the inflation is completed;
        a vehicle body side panel disposed on a vehicle body side when the inflation is completed;
        a front side panel forming a region on a front end side when the inflation is completed; and
        a rear side panel forming a region on a rear end side when the inflation is completed;
    corresponding edge portions of the occupant side panel, the vehicle body side panel, the front side panel and the rear side panel are configured to be joined to each other by a planar joining operation;
    the occupant side panel and the vehicle body side panel are set to have substantially the same outer shape;
    the outer shape of the front side panel and the rear side panel is a substantially elliptical shape having a major axis substantially along a left-right direction;
    outer peripheral edges of the front side panel and the rear side panel are joined to corresponding edge portions of the vehicle body side panel and the occupant side panel, respectively; and
    the front side panel and the rear side panel are separated from each other on a front-rear direction side, when the inflation is completed, by joining corresponding left and right edges of the vehicle body side panel and the occupant side panel to each other.

2. The airbag according to claim 1, wherein
    a left side joining portion and a right side joining portion, which are formed by joining corresponding left and right edges of the vehicle body side panel and the occupant side panel to each other, are disposed in a linear shape substantially along a front-rear direction when the inflation is completed.

3. The airbag according to claim 1, wherein
    a tether for regulating a separation distance between the occupant side panel and the vehicle body side panel in an up-down direction side when the inflation is completed is disposed inside the airbag.

4. The airbag according to claim 1, wherein:
    the base materials are formed of woven fabrics; and
    the front side panel and the rear side panel are both cut such that a warp or a weft is substantially along the front-rear direction when the inflation is completed.

* * * * *